United States Patent [19]
Balazs et al.

[11] Patent Number: 5,627,432
[45] Date of Patent: May 6, 1997

[54] COMPACT FLUORESCENT LAMP HAVING A LAMP ENVELOPE WITH A REFLECTIVE LAYER APPLIED TO THE ENDS THEREOF

[75] Inventors: Laszlo Balazs; Emoke Abasari; Ferenc Lantos; Istvanne Cserteg; Veronika V. Bobayne, all of Budapest, Hungary

[73] Assignee: General Electric Company, Schenectady, N.Y.

[21] Appl. No.: 410,448

[22] Filed: Mar. 24, 1995

[30] Foreign Application Priority Data

Mar. 29, 1994 [HU] Hungary .................................. 9400885

[51] Int. Cl.⁶ .................................................. H01J 61/35
[52] U.S. Cl. .......................... 313/635; 313/113; 313/493; 313/634
[58] Field of Search .................................. 313/113, 488, 313/493, 634, 635

[56] References Cited

U.S. PATENT DOCUMENTS 3,987,331 10/1976 Schreurs .................................. 313/113
4,841,193 6/1989 Nakamura et al. ..................... 313/493
5,341,068 8/1994 Nerone .................................. 315/219

FOREIGN PATENT DOCUMENTS 62-285357 12/1987 Japan .................................. 313/488

*Primary Examiner*—Nimeshkumar Patel
*Attorney, Agent, or Firm*—George E. Hawranko

[57] ABSTRACT

A single-ended low pressure mercury vapor discharge lamp including a lamp envelope having at least two tube portions being connected with each other and dosed with additive and gas, and a housing member made in a manner suitable for electrical and mechanical connection to a lamp holder on one end, and mechanically fixing and making electrical contact with the lamp envelope on the other end. The end portion of the tube portions of the lamp envelope which are set at the housing member side are externally coated with a light-reflecting layer.

12 Claims, 1 Drawing Sheet

COMPACT FLUORESCENT LAMP HAVING A LAMP ENVELOPE WITH A REFLECTIVE LAYER APPLIED TO THE ENDS THEREOF

FIELD OF THE INVENTION

This invention relates to a compact fluorescent lamp having a lamp envelope with a reflective layer applied to the ends thereof. More particularly, this invention relates to such a compact fluorescent lamp as achieves an improved lumen efficiency by virtue of such reflective layer.

BACKGROUND OF THE INVENTION

Consumers more and more often replace conventional incandescent lamps with single-ended low-pressure mercury vapor discharge lamps commonly known as compact fluorescent lamps. The reason for this is that these lamps have small size comparable to an incandescent lamp so as to fit within the same sockets and fixtures, and at the same time have luminous efficiencies many times greater that of the incandescent lamps. To achieve even a slight further increase in efficiency, lampmakers are making great efforts. It is known that the efficiency can be increased by using appropriately chosen phosphors with as uniform phosphor coating as possible. Additionally, further efficiencies can be gained by using an appropriately chosen frequency for the electronic circuitry that operates the lamp; an example of such circuitry as can be found in U.S. Pat. No. 5,341,068 issued to Nerone on Aug. 23, 1994, and herein incorporated by reference.

Accordingly, it would be advantageous to further improve the efficiency of single-ended low-pressure mercury vapor discharge lamps by minimizing the loss of light from the discharge lamp by providing those end portions of the tube portions of the discharge lamp, which end portions are adjacent to the top housing part of the discharge lamp, with a light-reflecting layer.

SUMMARY OF THE INVENTION

In accordance with this, our invention is related to a single-ended low-pressure mercury vapor discharge lamp comprising a lamp envelope composed of at least two tube portions being connected with each other and dosed with additive and gas, and a housing part where the housing part is made in a manner suitable for electrical and mechanical connection to a lampholder on one hand, and for mechanically fixing and making electrical contact with the lamp envelope on the other. The outside of those end portions of the tube portions of the lamp envelope adjacent to the top housing part are coated with a light-reflecting layer. With the discharge lamp according to the invention a substantial increase in luminous flux can be achieved due to the fact that the light-reflecting layer reflects also that portion of light from the discharge that would otherwise be lost by being conducted across the exhaust tube studs and the pinched ends of the lamp. This discharge lamp design can be made relatively simply since the coating can be applied to the ready-made lamp envelope; another advantage is that the light-reflecting layer disposed on the outside of the lamp envelope cannot react with any of the mercury dose, the discharge and the glass material.

In a further embodiment of the discharge lamp according to the invention the tube portions can be coated with the light-reflecting layer from the end portion of the tube extending slightly beyond the top surface of the housing portion. It is not preferable to coat the tube portions beyond this slight amount because at that portion the light-reflecting layer would shade rather than reflect light output. However, to achieve the highest possible efficiency, it is preferable to coat the entire surface of the tube portions being inside the housing portion.

BRIEF DESCRIPTION OF THE DRAWINGS

Our invention will be described in more details by means of an embodiment illustrated in the accompanying drawings in which.

DETAILED DESCRIPTION OF THE INVENTION

Figure 1:
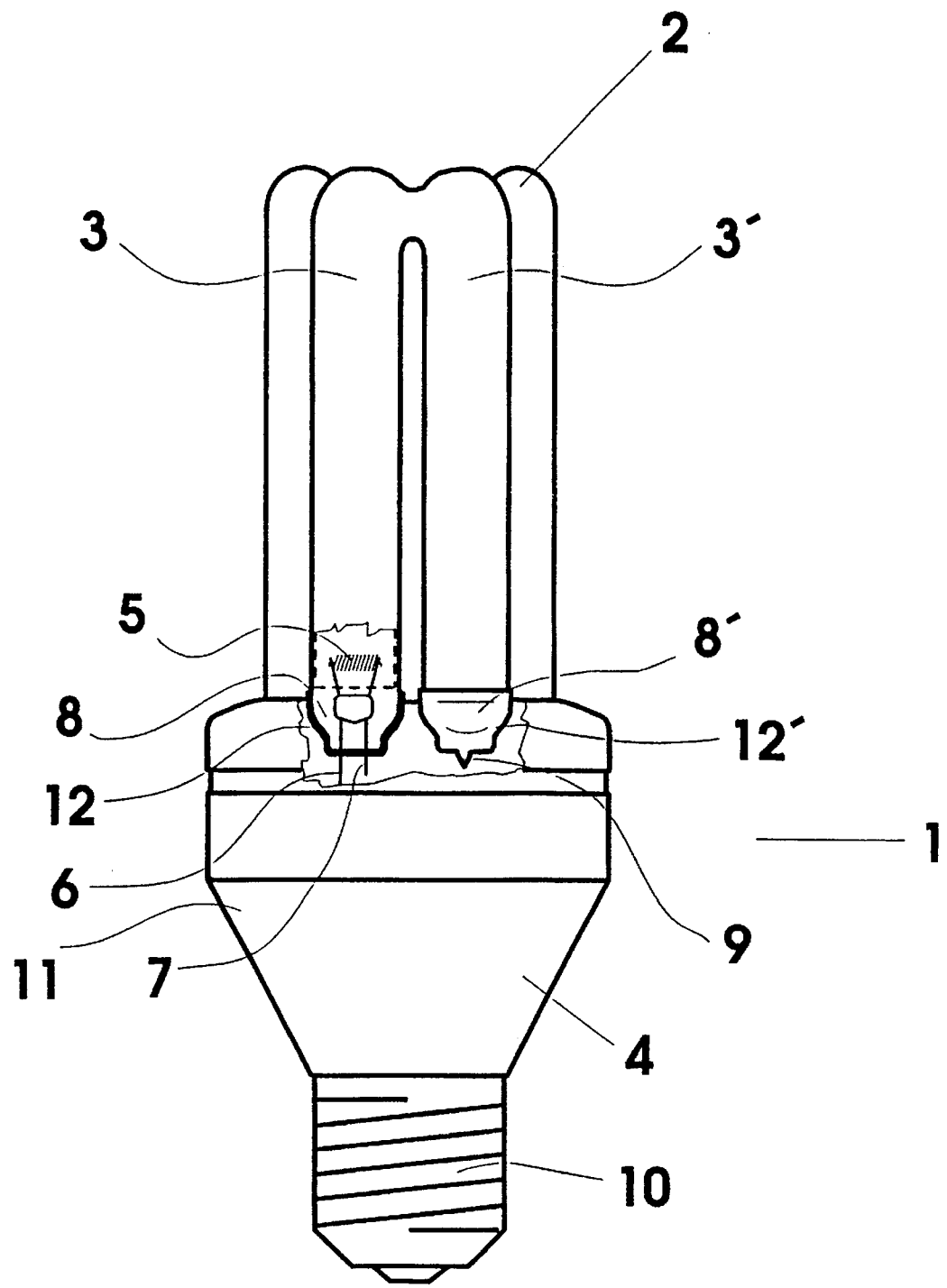
FIG. 1 is an elevational view in section of a discharge lamp according to the invention.

In the FIGURE, a low-pressure mercury vapor discharge lamp 1 is shown comprising a lamp envelope 2 and a housing member 4. The lamp envelope is composed of totally eight straight tube portions 3, 3' being parallel to and connected with each other and coated from inside with a phosphor, and contains a fill consisting of mercury and a noble gas. At the end portions of two tube portions 3, electrodes 5 are placed, the lead wires 6, 7 of which are sealed in a pinched portion 8 while the ends of the rest of tube portions 3' having no electrodes are represented by a pinched portion 8' and a tipped-off exhaust tube stud 9. The tube portions 3, 3' are mechanically fixed in the housing member 4 that also serves to contain the source of electrical supply, that is, the ballast circuit as described in the previously referenced U.S. Pat. No. 5,241,068, to the lamp envelope 2. The housing member 4 is composed of a screw base 10 made to have a thread or pins and of a housing body 11 that is also suitable for accepting an electronic circuitry. The end portions of tube portions 3, 3' including the pinched portions 8, 8' and the tipped-off exhaust tube stud 9 are, up to the height of the housing member 4, provided with outside light-reflecting layer 12, 12'. In this way, the most efficient surface is coated with the light-reflecting layer 12, 12' on one hand and the discharge lamp 1 has a more aesthetic appearance on the other, since the light-reflecting layer 12, 12' is covered by the housing 11.

It is also preferable to choose a grain size between 0.2 and 0.3 microns for the light-reflecting layer since the efficiency of light reflection would be lower both in the case of smaller and larger grain sizes. The limit values are interpreted so that the peak of the grain size distribution curve is to be between these two values.

For light-reflecting layer, several material types, e.g., a layer of or containing titanium dioxide can be used due to its advantageous properties. The surface density of the material applied is preferably chosen to be between 2 and 10 mg/cm$^2$. To explain this, a too thin layer would not satisfactorily while a too thick one would be excessive.

We have found that the discharge lamp according to the invention exhibits 1–4% higher luminous flux and efficiency than earlier single-ended low-pressure mercury vapor discharge lamps of similar size and construction do. This improvement is of particular importance in the case of discharge lamps composed of six and eight tube portions.

The layer 12, 12' consists of titanium dioxide, zirconium dioxide, barium sulfate or a different light-reflecting material, or the mixture thereof that can be applied by means of dipping, pouring, spraying or any other known method. The average grain size of the layer 12, 12 is 0.25 microns. In the case of titanium dioxide, the material is applied with a surface density of 2–10 mg/cm$^2$.

The scope of protection for our invention allows the discharge lamp according to our invention to be made in several different embodiments and, in accordance with this our invention is not intended to be limited to the examples shown beforehand.

What is claimed is:

1. A low pressure discharge lamp comprising:

a lamp envelope containing a gas fill and being coated along an inner surface with a phosphor layer, at least two ends of the lamp envelope having electrodes therein for selectively energizing the gas fill;

a housing receiving the at least two ends of the lamp envelope therein, the remainder of the envelope extending outwardly of the housing; and a reflective coating disposed on the at least two ends of the envelope disposed in the housing for reflecting light emitted from the at least two ends of the lamp envelope and increasing the luminous flux emitted from the lamp envelope.

2. The low pressure discharge lamp as defined in claim 1 wherein the lamp envelope includes plural envelope portions disposed in generally parallel relation and further comprising additional end portions to the at least two ends of the lamp envelope that are received in the housing, each of the additional end portions having the reflective coating thereon.

3. The low pressure discharge lamp as defined in claim 2 wherein the reflective coating is disposed on an external surface of the end portions.

4. The low pressure discharge lamp as defined in claim 1 wherein the reflective coating is disposed on an external surface of the at least two ends.

5. The low pressure discharge lamp as defined in claim 1 wherein substantially all of the lamp envelope disposed outside of the housing is void of the reflective coating.

6. The low pressure discharge lamp according to claim 1 wherein the lamp envelope comprises one to four parts of tube portions connected together to define a continuous discharge path, the tube portions each having an end portion supported in the support, a plurality of the end portions having the reflective coating.

7. The low pressure discharge lamp according to claim 6 wherein all of the said end portions of the tube portions have the reflective coating.

8. The low pressure discharge lamp according to claim 1 wherein the reflective coating is disposed on the external surface of each end.

9. The low pressure discharge lamp according to claim 1 wherein the reflective coating extends slightly above the housing.

10. The low pressure discharge lamp according to claim 1 wherein the reflective coating comprises grains that range in size from 0.2 to 0.3 microns.

11. The low pressure discharge lamp according to claim 1 wherein the reflective coating comprises titanium dioxide, zirconium dioxide, barium sulfate or mixtures thereof.

12. The low pressure discharge lamp according to claim 11 wherein the reflective coating comprises titanium dioxide and has a density of 2 to 10 mg/cm$^2$.

* * * * *